(12) United States Patent
Murata et al.

(10) Patent No.: US 8,245,803 B2
(45) Date of Patent: Aug. 21, 2012

(54) WHEEL ASSEMBLY WITH IN-WHEEL MOTOR

(75) Inventors: Satoshi Murata, Aichi-ken (JP); Michitaka Tsuchida, Susono (JP); Hiroaki Urano, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 749 days.

(21) Appl. No.: 11/836,938

(22) Filed: Aug. 10, 2007

(65) Prior Publication Data

US 2008/0035407 A1    Feb. 14, 2008

(30) Foreign Application Priority Data

Aug. 11, 2006   (JP) .................... 2006-219766

(51) Int. Cl.
*B60K 7/00* (2006.01)
(52) U.S. Cl. .................... 180/65.51; 180/65.6
(58) Field of Classification Search ............ 180/65.51, 180/65.6
See application file for complete search history.

(56) References Cited

U.S. PATENT DOCUMENTS

| | | | | |
|---|---|---|---|---|
| 4,799,564 A | * | 1/1989 | Iijima et al. | 180/65.51 |
| 5,127,485 A | * | 7/1992 | Wakuta et al. | 180/65.51 |
| 5,372,213 A | * | 12/1994 | Hasebe et al. | 180/65.6 |
| 5,419,406 A | | 5/1995 | Kawamoto et al. | |
| 6,113,119 A | * | 9/2000 | Laurent et al. | 280/124.1 |
| 6,139,464 A | * | 10/2000 | Roske | 475/331 |
| 6,329,731 B1 | * | 12/2001 | Arbanas et al. | 310/52 |
| 7,000,727 B2 | * | 2/2006 | Korenjak et al. | 180/292 |
| 7,228,928 B2 | * | 6/2007 | Mizutani et al. | 180/65.51 |
| 7,421,928 B2 | * | 9/2008 | Klaus et al. | 74/606 R |
| 7,641,010 B2 | | 1/2010 | Mizutani et al. | |
| 2006/0144626 A1 | * | 7/2006 | Mizutani et al. | 180/65.5 |

FOREIGN PATENT DOCUMENTS

| | | |
|---|---|---|
| DE | 42 36 093 A1 | 4/1993 |
| DE | 699 23 553 T2 | 2/2006 |
| DE | 10 2006 000 908 A1 | 7/2006 |
| JP | 6-105516 | 4/1994 |
| JP | 2004-90822 | 3/2004 |
| JP | 2004-168211 | 6/2004 |
| JP | 2005-73364 | 3/2005 |
| JP | 2005-263140 | 9/2005 |
| JP | 2005-335623 | 12/2005 |

OTHER PUBLICATIONS

Office Action issued Jan. 25, 2011, in German Patent Application No. 10 2007 037 832.9-22 with English translation.

* cited by examiner

*Primary Examiner* — Katy M Ebner
(74) *Attorney, Agent, or Firm* — Oblon, Spivak, McClelland, Maier & Neustadt, L.L.P.

(57) ABSTRACT

A wheel assembly with an in-wheel motor, which transmits rotational output of an output shaft of a motor to a wheel via a counter gear, is provided with an oil pump that is driven by rotational output of the counter gear and an oil flow path that leads oil from the oil pump to the motor.

14 Claims, 2 Drawing Sheets

WHEEL ASSEMBLY WITH IN-WHEEL MOTOR

INCORPORATION BY REFERENCE

The disclosure of Japanese Patent Application No. 2006-219766 filed on Aug. 11, 2006, including the specification, drawings and abstract is incorporated herein by reference in its entirety.

BACKGROUND OF THE INVENTION

1. Field of the Invention

The invention relates to a wheel assembly with an in-wheel motor, which transmits rotational output of the motor to a wheel via a counter gear.

2. Description of the Related Art

Japanese Patent Application Publication No. JP-A-2005-335623, for example, describes a related wheel assembly with an in-wheel motor, which reduces (i.e., slows or decelerates) rotational output of a motor and then transmits it to a wheel. In this wheel assembly with an in-wheel motor, an oil pump is driven by a shaft that rotates at a slowed rate.

However, with the invention described in Japanese Patent Application Publication No. JP-A-2005-335623, a planetary gear set, which serves as the reduction mechanism, is arranged concentric and in series with the motor. Thus, with this structure it is easy to supply oil from the oil pump to the planetary gear set, but not easy to supply oil from the oil pump to the motor.

In contrast, when the oil pump is operated using the rotational output of the motor, the oil pump can be arranged close to the motor which makes it easier to supply oil from the oil pump to the motor. In this case, however, the oil pump is driven by a shaft that does not rotate at a slowed rate, which is disadvantageous from the viewpoint of durability of the oil pump.

SUMMARY OF THE INVENTION

This invention thus provides a wheel assembly with an in-wheel motor (the term "in-wheel motor" in this specification refers to a motor that is housed within a wheel), which can easily supply oil from an oil pump to the motor without losing durability of the oil pump.

A first aspect of the invention relates to a wheel assembly with an in-wheel motor, which transmits rotational output of an output shaft of a motor to a wheel via a counter gear. This wheel assembly with an in-wheel motor includes an oil pump that is driven by rotational output of the counter gear, and an oil flow path that leads oil from the oil pump to the motor.

In the wheel assembly with an in-wheel motor according to the first aspect of the invention, the oil pump may be arranged inside the counter gear or on the motor side of the counter gear. Arranging the oil pump inside the counter gear efficiently reduces the length in the axle direction.

The oil pump may be arranged concentrically, with an axle center as an axis, with respect to the counter gear.

In the wheel assembly with an in-wheel motor according to the first aspect of the invention, the output shaft of the motor may be arranged offset upward, in a vehicle height direction, and forward, in a vehicle longitudinal direction, with respect to the axle center.

Also, the output shaft of the motor may be arranged offset with respect to the axle center by a distance substantially equal to the distance of the combined radii of a driving gear and the counter gear.

In the wheel assembly with an in-wheel motor according to the first aspect of the invention, the oil flow path may be formed by an oil delivery which encircles a coil end of the motor and has a tubular cross section. Also, the oil delivery may have distribution holes that open to the outside in the radial direction at angular positions which are at appropriate intervals in the circumferential direction.

The foregoing aspect of the invention enables oil to easily be supplied from the oil pump to the motor without losing durability of the oil pump.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of exemplary embodiments.

Figure 1:
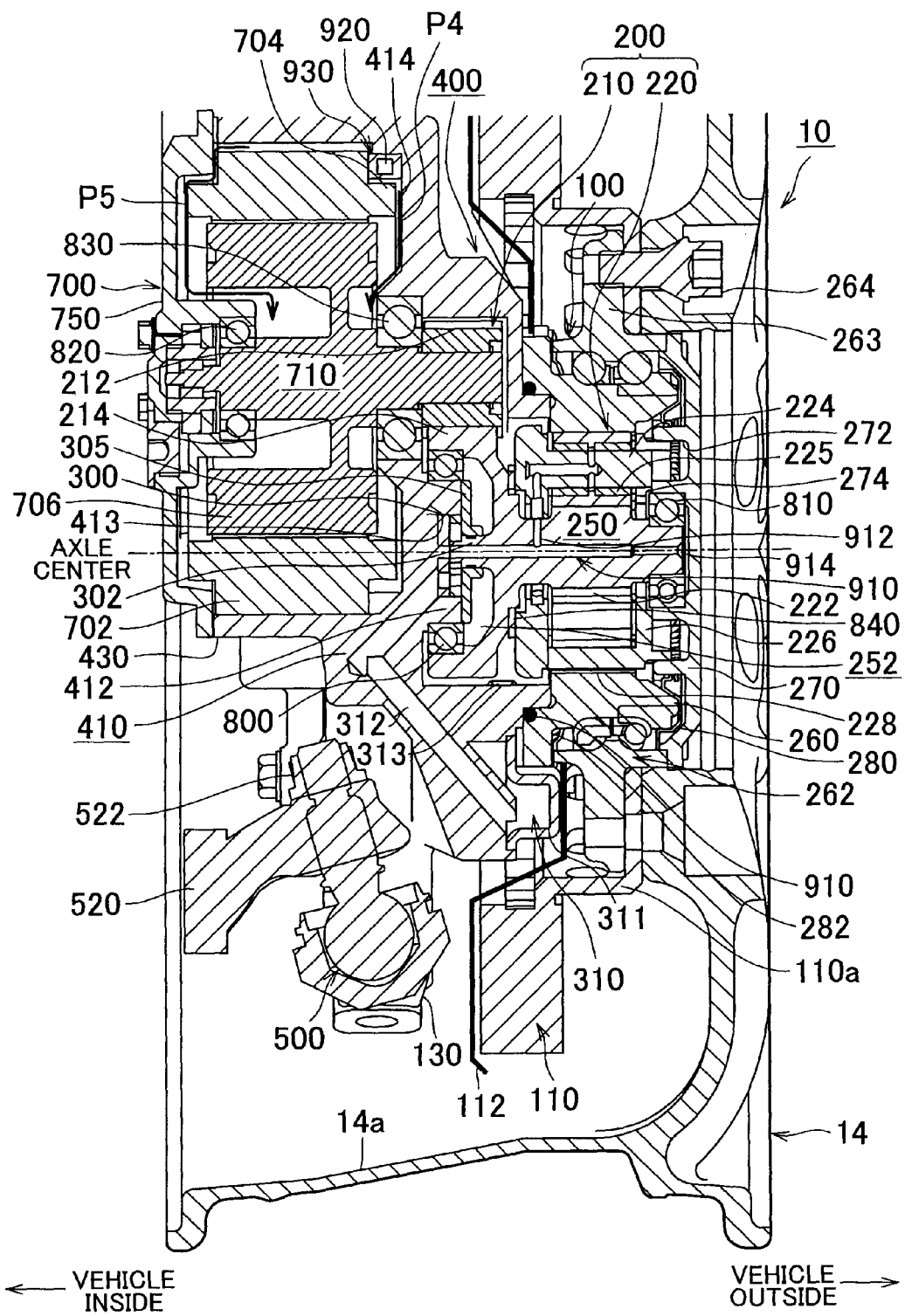
FIG. 1 is a sectional view of the main structure of a wheel assembly with an in-wheel motor according to one example embodiment of the invention.

FIG. 1 is a sectional view of the main structure of a wheel assembly with an in-wheel motor according to one example embodiment of the invention. In the drawing, the tire, as well as the upper ⅓ or so of the wheel, is omitted.

A tire/wheel assembly 10 includes a wheel 14 to which a tire, not shown, is mounted. As will be described in detail later, the main portions of the constituent elements related to the motor are housed in a space enclosed by a rim inner peripheral surface 14a of the wheel 14. In the following description, the words "inside of the tire/wheel assembly" refer to the generally columnar space that is enclosed by the rim inner peripheral surface 14a of the wheel 14. However, expressions such as "a part is arranged inside the tire/wheel assembly" do not always mean that the entire part is housed completely within this generally columnar space. They also include structures in which a portion of the part partially protrudes from within that generally columnar space.

Arranged within the tire/wheel assembly 10 are mainly an axle bearing 100, a brake disc 110, a brake dust cover 112 that covers the brake disc 110 from the inner side of the vehicle in the vehicle width direction (hereinafter also referred to simply as "vehicle inside"), a brake caliper (not shown), a motor 700 for driving the wheel, a reduction mechanism 200, an oil pump 300, an oil tank (i.e., an oil reservoir) 310, oil flow paths 910 and 920, a knuckle (i.e., a carrier) 400, and a lower ball joint 500 that is connected to a wheel-side end portion of a lower arm 520. Also, although not shown, a ball joint that is connected to a wheel-side end portion of a tie rod, not shown, and an upper ball joint that is connected to the wheel-side end portion of an upper arm are also arranged in the tire/wheel assembly 10. However, when strut type suspension is used, the lower end of the strut (i.e., shock absorber), instead of the upper arm, is connected to the upper side of the knuckle 400.

The motor 700 is arranged in a space on the vehicle inside within the tire/wheel assembly 10. As shown in FIG. 1, the motor 700 is arranged offset upward, in the height direction of the vehicle, and forward, in the longitudinal direction of the vehicle, with respect to the axle center (see FIG. 2). Accordingly, a space not occupied by the motor 700, which corresponds to the amount that the motor 700 is offset, is created to the lower rear on the vehicle inside within the tire/wheel assembly 10, as shown in FIG. 1. Therefore, the lower space on the vehicle inside within the tire/wheel assembly 10 is larger than it is with a structure in which the motor is arranged on the same axis as the axle center. As a result, there is a larger degree of freedom for arranging the suspension on the lower side. Also, the brake caliper can easily be housed on the side (i.e., the vehicle rear side in this example) opposite the side (i.e., the vehicle front side) to which the motor 700 is offset within the tire/wheel assembly 10 (see the brake caliper mounting point 122 in FIG. 2).

The motor 700 includes a stator core 702, a stator coil 704, and a rotor 706. If the motor 700 is a three phase motor, the stator coil 704 may include a U phase coil, a V phase coil, and a W phase coil. The rotor 706 is arranged on the inner peripheral sides of the stator core 702 and the stator coil 704.

The rotor 706 of the motor 700 has an output shaft 710, the rotational center of which is offset with respect to the axle center, as described above. The output shaft 710 is rotatably supported by a motor cover 750 via a bearing 820 on the vehicle inside in the tire/wheel assembly 10, as well as rotatably supported by the knuckle 400 (main structure portion 410) via a bearing 830 on the outer side of the vehicle in the vehicle width direction (hereinafter also referred to simply as "vehicle outside") in the tire/wheel assembly 10. The bearings 820 and 830 may be radial ball bearings which use balls as rolling bodies, such as single-row, deep-grooved ball bearings, for example.

The rotational output of the motor 700 is transmitted to the wheel 14 via the reduction mechanism 200. The reduction mechanism 200 is a twin shaft reduction mechanism which includes a counter gear mechanism 210 that serves as a first reduction mechanism, and a planetary gear set 220 that serves as a second reduction mechanism. Thus the reduction mechanism realizes a two step reduction. Gears 212, 214, 222, 224, 226, and 228 of the reduction mechanism 200, which will be described below, may be helical gears.

As shown in FIG. 1, the counter gear mechanism 210 is arranged farther to the vehicle outside than the motor 700. The counter gear mechanism 210 includes a small diameter driving gear 212 which is arranged on the output shaft 710 of the motor 700, and a large diameter counter gear 214 that is in mesh with the driving gear 212. The small diameter driving gear 212 is spline fitted to the output shaft 710 of the motor 700 from the vehicle outside, and thus integrated with the output shaft 710. The large diameter counter gear 214 is formed with the axle center as its rotational center. The output shaft 710 of the motor 700 is arranged offset with respect to the axle center by approximately the distance of the combined radii of the driving gear 212 and the counter gear 214.

As shown in FIG. 1, the planetary gear set 220 is arranged farther to the vehicle outside than the counter gear mechanism 210 within the tire/wheel assembly 10. The planetary gear set 220 is arranged on the same axis as the axle center, and includes a sun gear 222, a planetary gear 224, a planetary carrier 226, and a ring gear 228.

The sun gear 222 is connected to the counter gear 214 of the counter gear mechanism 210. In the example shown in FIG. 1, the sun gear 222 is formed on one end side of a shaft (i.e., sun gear shaft) 250 and the counter gear 214 is formed on the other end side of the shaft 250 in the width direction of the vehicle. More specifically, the shaft 250 has a rotational center that is on the same axis as the axle center. The sun gear 222 is positioned on the peripheral surface of the end portion on the vehicle outside, and the counter gear 214 is positioned on the peripheral surface of the end portion on the vehicle inside. The end portion of the shaft 250 on the vehicle inside is rotatably supported by the knuckle 400 via a bearing 800, and the end portion of the shaft 250 on the vehicle outside is rotatably supported by a disc-shaped power transmitting member 270 via a bearing 810. The sun gear 222 and the counter gear 214 may also be formed as separate parts, in which case they may be connected using splines. Also, the bearings 800 and 810 may be radial ball bearings which use balls as rolling bodies, such as single-row, deep-grooved ball bearings, for example. Further, as shown in FIG. 1, the bearing 800 may be incorporated inside (i.e., on the inner peripheral side of) the counter gear 214, and a convex portion 412 of the knuckle 400 connected by press-fitting or the like to the inner race side of the bearing 800.

The planetary gear 224 is in mesh with the sun gear 222 on the inner peripheral side and in mesh with the ring gear 228 on the outer peripheral side. The planetary gear 224 is rotatably supported by the planetary carrier 226 via a roller bearing 225. The rotational center of the planetary carrier 226 is the same as the axle center. The planetary carrier 226 is supported at the vehicle inside within the tire/wheel assembly 10 by the shaft 250 via a thrust cylindrical roller bearing 840, and is spline fitted at the vehicle outside to a circumferential groove 272 formed circumferentially in the power transmitting member 270. A plurality of the planetary gears 224 are arranged at equidistant intervals around the sun gear 222. The planetary gears 224 and the planetary carrier 226 are assembled to form a single unit (hereinafter referred to as "planetary gear unit"). The planetary carrier 226 of this planetary gear unit abuts against a stopper portion 274 of the power transmitting member 270 on the vehicle outside. Accordingly, displacement of the planetary gear unit in the width direction of the vehicle is restricted by the thrust cylindrical roller bearing 840 and the stopper portion 274.

The rotational center of the ring gear 228 is the same as the axle center. The ring gear 228 is formed on the inner peripheral surface of an inner race side member 260 that is arranged so as to surround the sun gear 222 from the outer peripheral side. The outer peripheral surface of the inner race side member 260 forms an inner race of the axle bearing 100. In the illustrated example, the axle bearing 100 is a double-row angular ball bearing. The outer inner race with respect to the row on the vehicle outside is formed of a separate member than the inner race side member 260. This kind of separate member is integrated with the inner race side member 260 by fitting it around the outer periphery of the inner race side member 260 and crimping it thereto.

An outer race side member 262 is arranged so as to surround the inner race side member 260 from the outer peripheral side. The inner peripheral surface of the outer race side member 262 forms an outer race of the axle bearing 100. Seals 280 and 282 for preventing foreign matter from getting in and oil from flowing out are provided at the end portions in the width direction of the vehicle between the outer race side member 262 and the inner race side member 260.

The power transmitting member 270 is a disc-shaped member provided so as to cover the vehicle outside of the reduction mechanism. The circumferential groove 272 to which the vehicle outside end portion (peripheral wall portion) of the planetary carrier 226 is spline fitted is formed on the vehicle inside of the power transmitting member 270. The outer peripheral edge of the power transmitting member 270 is connected to the end portion on the vehicle outside of the outer race side member 262 by crimping or the like. That is, the power transmitting member 270 is fixed to the outer race side member 262 so that it blocks a generally circular opening on the vehicle outside of the outer race side member 262. The outer race side member 262 has a flange portion 263 that protrudes toward the outside in the radial direction on the outer peripheral surface. A bolt hole for fastening a hub bolt 264 is formed in this flange portion 263. The outer race side member 262 is fastened together with the brake disc 110 by the hub bolt to the wheel 14 with the inner peripheral portion of the brake disc 110 being sandwiched between the flange portion 263 and the wheel 14.

In the foregoing structure, when the rotor 706 of the motor 700 rotates in response to a command from a vehicle control apparatus, not shown, the small diameter driving gear 212 of the counter gear mechanism 210 rotates, and as it does so, the large diameter counter gear 214 that is in mesh with the driving gear 212 rotates, thus realizing a first reduction. When the counter gear 214 rotates, the sun gear 222, which is integral with the counter gear 214, also rotates. As a result, the planetary gears 224 rotate while revolving around the sun gear 222. This rotation realizes a second reduction. The revolving motion of the planetary gears 224 is output by the planetary carrier 226 and transmitted to the power transmitting member 270 which is spline fitted to the planetary carrier 226. The tire/wheel assembly 10 is driven as the outer race side member 262, the brake disc 110, and the wheel 14 all rotate together with the power transmitting member 270.

The knuckle 400 includes a main structure portion 410 positioned near generally the center of the tire/wheel assembly 10, and a cylindrical peripheral wall portion (i.e., a motor case portion) 430. The main constituent elements of the motor 700 described above are arranged in a space to the inside in the radial direction of the peripheral wall portion 430 of the knuckle 400. The motor cover 750 is connected to the end portion on the vehicle inside of the peripheral wall portion 430 of the knuckle 400 so as to cover the space inside the peripheral wall portion 430. A gasket, not shown, for preventing oil from leaking out may also be provided at the portion where the peripheral wall portion 430 and the motor cover 750 connect.

Figure 2:
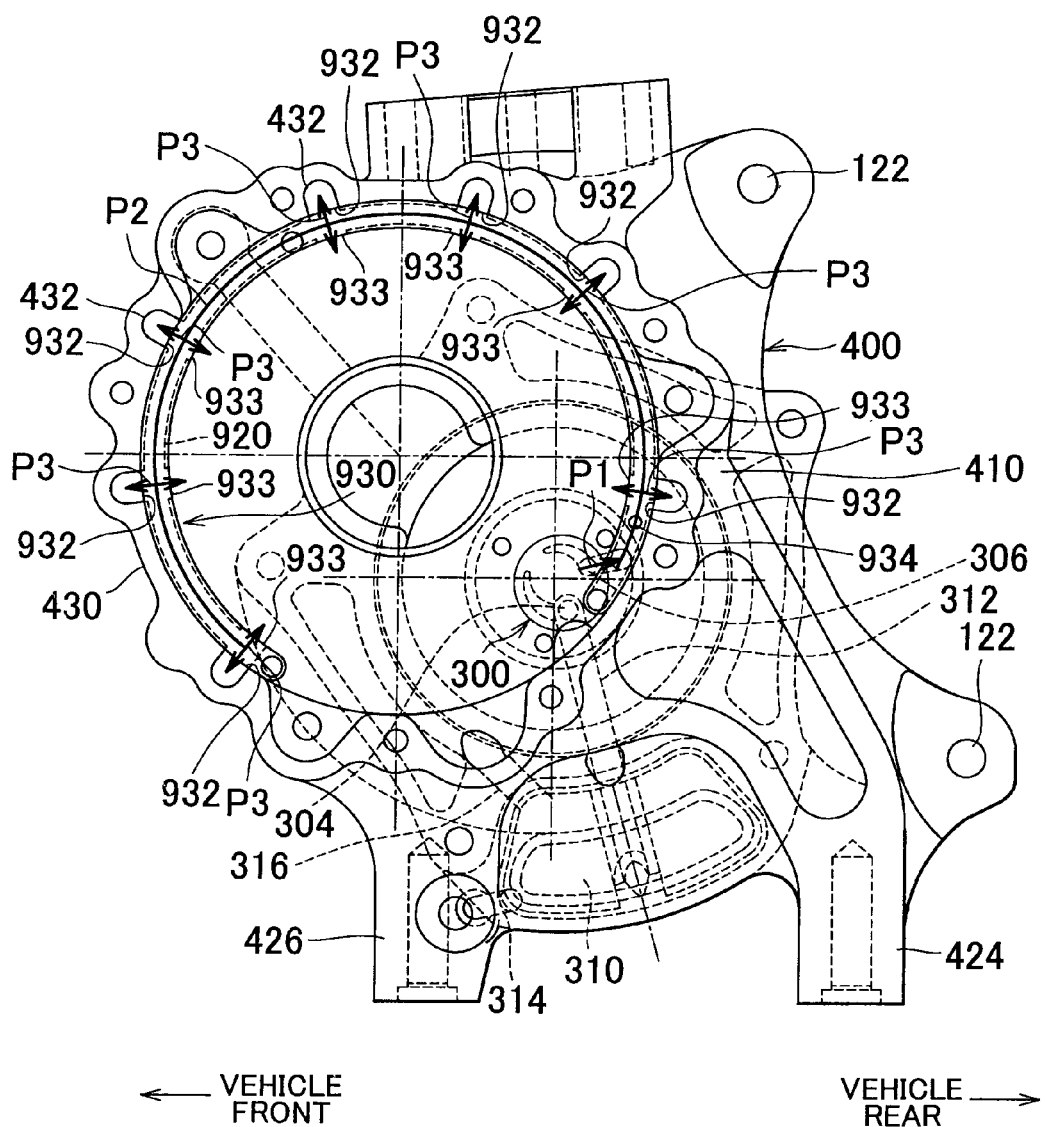
FIG. 2 is a view illustrating oil flow paths for cooling the motor and lubricating bearings.

Unlike the thin peripheral wall portion 430 and other ribs and the like, the main structure portion 410 of the knuckle 400 has sufficient strength and rigidity, and therefore serves to receive loads input via the portion where the axle bearing 100 is connected, the mounting points of the tie rod and the suspension arm (i.e., lower arm 520, etc.), and the brake caliper mounting point 122 (see FIG. 2).

The inner race side member 260 is connected by press-fitting or bolts, for example, to the end portion on the vehicle outside of the main structure portion 410 of the knuckle 400. An O-ring for preventing oil from leaking out may be provided at the joining portion between the inner race side member 260 and the main structure portion 410 of the knuckle 400.

The main structure portion 410 of the knuckle 400 receives various loads input from the tire/wheel assembly 10 via the axle bearing 100 (i.e., the inner race side member 260) at the vehicle outside end portion. The counter gear mechanism 210 described above is arranged in the space inside the main structure portion 410 of the knuckle 400. The main structure portion 410 of the knuckle 400 receives various thrust loads and radial loads input via the bearing 830 and the bearing 800. The main structure portion 410 of the knuckle 400 is highly rigid so the dynamic load rating or the dynamic equivalent load of the bearings 830 and 800 is preferably set higher than it is for the corresponding bearings 820 and 810. As a result, a reasonable structure that can withstand a large load can be realized at portions with high strength and rigidity.

The main structure portion 410 of the knuckle 400 has two leg portions 424 and 426 (see FIG. 2) that extend to the lower side. A knuckle arm 130 is fastened by a bolt or the like to the lower end of the each leg portion 424 and 426. The knuckle arm 130 extends in the longitudinal direction of the vehicle within the tire/wheel assembly 10. A ball joint for mounting a tie rod is installed on the front end side of the knuckle arm 130 and the lower ball joint 500 is installed on the rear end side of the knuckle arm 130. The main structure portion 410 of the knuckle 400 receives various loads input via the lower ball joint 500 and the like.

As shown in FIG. 1, the lower ball joint 500 is arranged farther toward the vehicle inside than the brake disc 110. The lower arm 520 is fastened to the lower ball joint 500 by a nut 522 from above. The lower arm 520 extends in the width direction of the vehicle and the vehicle inside end portion is supported by a vehicle body, not shown, via a bush and the like. The lower arm 520 may be any type. For example, it may be an L-shaped lower arm or a double ring type lower arm. The lower arm 520 works in cooperation with the upper arm (or strut), not shown, to pivotally support the tire/wheel assembly 10 with respect to the vehicle body. Also, a spring and an absorber, not shown, are provided between the vehicle body and the lower arm 520. As a result, input from the tire/wheel assembly 10 to the vehicle body is reduced. The spring may be any type of a spring coil or an air spring of. The absorber may not only be a hydraulic absorber that applies damping action to vertical input but also a rotary electromagnetic absorber that applies damping action to rotational input. 205-32

In this example embodiment, the motor 700 is offset upward with respect to the axle center, as described above. This increases the degree of freedom in the arrangement/position of the lower ball joint 500 (i.e. in the arrangement of the kingpin axis). For example, the lower ball joint 500 can also be moved as close to the brake disc 110 as possible, leaving only the necessary clearance, as shown in FIG. 1. As a result, the amount of offset of each member and the tire input point in the width direction of the vehicle is reduced, thereby enabling the necessary strength and rigidity of the members (such as the main structure portion 410 of the knuckle) to be reduced, which reduces weight.

The oil tank 310 is formed below the knuckle 400 and is arranged below, along a vertical line that is orthogonal to, the axle center in the tire/wheel assembly 10, as shown in FIG. 1. The oil tank 310 is preferably arranged below the lowest position of the gear portion of the reduction mechanism 200. Also, the oil tank 310 is arranged farther to the vehicle outside than the lower ball joint 500 and farther to the vehicle inside than the brake dust cover 112, as shown in FIG. 1.

The oil tank 310 is arranged using the space inside a hat portion 110a of the brake disc 110. In the example illustrated, the oil tank 310 is formed by a cover member 311 that is fixed to the knuckle 400 from the vehicle outside. The cover member 311 may be connected to the knuckle 400 by crimping or a bolt or the like. According to this structure, the oil tank 310 is arranged completely offset with respect to the lower ball joint 500 in the width direction of the vehicle. As a result, even if oil were to leak from the oil tank 310 due to the oil tank 310 being damaged or the like, the leaking oil would be reliably prevented from getting onto the lower ball joint 500, thus reliably preventing a decline in performance of the lower ball joint 500.

A lower end portion of a suction path 312 formed in the knuckle 400, as well as an oil return path 313 for returning oil, is communicated with the oil tank 310. The oil tank 310 serves to collect oil for cooling the motor 700 or lubricating the reduction mechanism 200.

Also, a drain flow path 314 and a filler flow path 316 formed in the knuckle 400 are also communicated with the oil tank 310 (see FIG. 2). The openings of the drain flow path 314 and the filler flow path 316 are closed by a drain plug and a filler plug, respectively, not shown.

The oil pump 300 is arranged between the motor 700 and the planetary gear set 220 of the reduction mechanism 200 in the width direction of the vehicle. More specifically, the oil pump 300 is provided on the vehicle inside end portion of the shaft 250. In the example shown in FIG. 1, the oil pump 300 is arranged inside the counter gear 214 of the counter gear mechanism 210, i.e., to the inside of the counter gear 214 in the radial direction. More specifically, a convex portion 412 of the knuckle 400 is accommodated within a cavity 252 to the inside in the radial direction of a vehicle inside end portion (i.e., of a portion with a larger diameter for forming the counter gear 214) of the shaft 250. A concave portion 413 is formed to the inside of the convex portion 412 in the radial direction. The oil pump 300 is provided in this concave portion 413. The inside portion of this concave portion 413, as well as the area around a pump rotating shaft 302 that extends into the concave portion 413, is sealed by a seal member 305.

Not only a trochoid pump as shown in the drawings, for example, but the oil pump 300 may also be any of a variety of gear pumps such as an external gear pump or an internal gear pump (with or without a crescent-shaped partition), or another type of hydraulic pump such as a vane pump.

The oil pump 300 is driven by rotational output of the motor 700. More specifically, the inner rotor of the oil pump 300 is connected to the pump rotating shaft 302 which is integral with the shaft 250, and thus rotates when the shaft 250 rotates. That is, the inner rotor of the oil pump 300 is driven by the same shaft that the counter gear 214 is provided on. When the inner rotor rotates, so too does the outer rotor which has a rotational axis that is offset with respect to the rotational axis of the inner rotor. As a result, oil in the oil tank (reservoir tank) 310 is drawn up via the suction path 312. The oil that is drawn in through the inlet 304 (see FIG. 2) is then caught between the inner and outer rotors of the oil pump 300 and discharged from an outlet 306 (see FIG. 2) mainly to oil flow paths 910 and 920. These oil flow paths 910 and 920 will be described later.

In this example embodiment, as described above, the oil pump 300 is driven by rotational output of the counter gear 214. Therefore, the oil pump 300 is driven at a speed that is slower than the speed of the motor 700 by the amount corresponding to the speed reduction from the counter gear mechanism 210. As a result, the fastest rotation speed of the oil pump 300 is less than it is when the oil pump 300 is driven by the output shaft 710 of the motor 700, which improves the durability of the oil pump 300.

Also, in this example embodiment, as described above, the oil pump 300 is set inside the shaft 250 (i.e., inside the counter gear 214) and arranged in substantially the same area as the counter gear mechanism 210 in the width direction of the vehicle. Therefore, the length in the axial direction necessary to arrange the motor 700, the oil pump 300, and the reduction mechanism 200 can be shortened by the amount of the oil pump 300 compared to when the motor, oil pump, and reduction mechanism are arranged in series.

Next, the main oil flow paths 910 and 920 through which the oil that is discharged from the oil pump 300 flows will be described.

The oil flow path 910 formed in the shaft 250 is communicated to the outlet 306 of the oil pump 300 (see FIG. 2). The oil that was discharged from the outlet 306 to the oil flow path 910 is supplied to the bearing 810 via an opening 914 in the tip end portion of the shaft 250, and supplied to the planetary gears 224 via oil holes 912 by centrifugal force generated as the shaft 250 rotates. The oil supplied in this way is used to lubricate the bearing 810, as well as the roller bearings 225 of the planetary gears 224.

FIG. 2 is a view illustrating the oil flow paths for cooling the motor 700 and lubricating the bearings 820, 830, and 800. FIG. 2 is a plan view of the inside of the peripheral wall portion (i.e., the motor case portion) 430 of the knuckle 400 as it appears when viewed from the vehicle inside, with the internal elements of the motor 700 and the motor cover 750 omitted. In the drawing, members of little relevance in describing the oil flow paths are omitted as appropriate.

The oil flow path 920 (see also FIG. 1) provided using the space near the coil end is communicated with the outlet 306 of the oil pump 300. The oil flow path 920 encircles the coil end at a corner portion near the base of the peripheral wall portion 430 of the knuckle 400, as shown in FIG. 2. The oil flow path 920 may also be formed in the knuckle 400, but is preferably formed by a member 930 (hereinafter referred to as "oil delivery 930") that is separate from the knuckle 400. This oil delivery 930 has a tubular cross section and is formed by an elastic member, for example. The oil delivery 930 is arranged so as to be tightly sandwiched between a bottom surface 414 of the knuckle 400 and the vehicle outside end surface of the stator core 702, as shown in FIG. 1.

The oil delivery 930 has distribution holes 932 that open to the outside in the radial direction formed in angular positions at appropriate intervals in the circumferential direction. Oil grooves 432 that extend in the axial direction are formed at each of the angular positions corresponding to the distribution holes 932 in the inner peripheral surface of the peripheral wall portion 430 of the knuckle 400.

Also, the oil delivery 930 has distribution holes 933 that open to the inside in the radial direction formed in angular positions at appropriate intervals in the circumferential direction, as shown in FIG. 2. In the example shown in the drawing, the distribution holes 933 are formed in the same angular positions as the distribution holes 932. Alternatively, however, the set number and angular positions of the distribution holes 933 may be different than those of the distribution holes 932.

Also, the oil delivery 930 has a bearing delivery hole 934 formed near an angular position in the circumferential direction that intersects with the position in which the bearing 800 is arranged when viewed from the axial direction. The bearing distribution hole 934 opens in the axial direction toward the bearing 800 (i.e., in a direction perpendicular to the paper on which FIG. 2 is drawn).

Oil discharged from the outlet 306 to the oil flow path 920 (i.e., the flow path in the oil delivery 930), as shown by arrow P1 in FIG. 2, is delivered to the area around the coil end, as shown by arrow P2 in FIG. 2. In this process, some of the oil is supplied to the bearing 800 via the bearing distribution hole 934 to lubricate the bearing 800. Also, other oil is delivered radially inward and outward out of the oil delivery 930 via the plurality of distribution holes 932 and 933. The oil discharged into the oil grooves 432 via the distribution holes 932 is led in the direction in which the oil grooves 432 extend so that it flows around the entire outer peripheral surface of the stator core 702, thus cooling the entire stator core 702. Similarly, the oil discharged via the distribution holes 933 directly contacts the coil end of the stator core 702, thus cooling the entire stator coil 704 including the coil end. Also, oil supplied to the inside of the motor 700 via the distribution holes 933 and 932 reaches the output shaft 710 of the motor 700 while cooling the stator core 702 and the stator coil 704 and the like, and lubricates both bearings 820 and 830 on the inside and outside in the width direction of the vehicle.

Oil used for cooling or lubrication as described above is then finally returned to the oil tank 310 by gravity.

According to the foregoing example embodiment, as described above, the oil pump 300 is provided adjacent to the counter gear 214 that reduces the rotational output of the motor 700, i.e., the oil pump 300 is arranged between the motor 700 and the reduction mechanism 200. Therefore, it is easy to arrange oil flow paths for cooling the motor 700 and lubricating the various bearings (such as the bearings 800, 810, 820, and 830).

Also, in the foregoing example embodiment, as described above, the oil pump 300 is arranged between the motor 700 and the reduction mechanism 200. Therefore, coupled with arranging of the motor 700 offset with respect to the oil pump 300, it is also easy to form the suction path 312 from the oil tank 310 which is underneath, while avoiding the motor 700.

While example embodiments of the invention have been illustrated above, it is to be understood that the invention is not limited to details of the illustrated embodiments, but may be embodied with various changes, modifications or improvements without departing from the spirit and scope of the invention.

For example, in the example shown in the drawings, the oil pump 300 is arranged inside the counter gear portion 214 of the counter gear mechanism 210 in order to shorten the length in the axial direction. However, the pump rotating shaft 302 of the shaft 250 may extend farther on the vehicle inside and the position of the oil pump 300 may be offset farther to the vehicle inside than the position shown in the drawings. That is, the oil pump 300 may be arranged to the outside of the counter gear 214 on the motor 700 side. In this case as well, the oil flow path from the oil pump 300 to the motor 700 and the like can easily be formed.

Also, in the example shown in the drawings, the pump rotating shaft 302 is integrally formed with the shaft 250, but it may also be separate.

Further, in the example shown in the drawings, the counter gear 214 is arranged farther to the vehicle outside than the motor 700. Alternatively, however, the counter gear 214 may be arranged farther to the vehicle inside than the motor 700.

Also, in the example shown in the drawings, the reduction mechanism 200 realizes a two step reduction. However, the reduction mechanism may also realize a one step reduction or a three or more step reduction. Also, the reduction mechanism 200 realizes the two step reduction by the counter gear mechanism 210 which serves as the first reduction mechanism and the planetary gear set 220 which serves as the second reduction mechanism, but other combinations are also possible. For example, the first and second reduction mechanisms may both be planetary gear sets and a two step reduction may be realized by arranging those planetary gear sets in series.

Moreover, in the illustrated example, the counter gear mechanism 210 is such that the diameter of the main structure portion 410 of the knuckle 400 that surrounds the counter gear mechanism 210 is reduced by circumscribing the counter gear 214 on the driving gear 212 that is directly connected to the motor 700. However, the driving gear 212 may also be inscribed in a larger diameter counter gear. That is, the structure may be such that teeth on the inner peripheral surface of the counter gear mesh with teeth on the outer peripheral surface of the driving gear 212.

Also, in the illustrated example, oil from the oil pump 300 is supplied to cool the motor 700 and lubricate the reduction mechanism 200. However, oil from the oil pump 300 may also be supplied only to the motor 700. Alternatively, oil from the oil pump 300 may be led to the brake caliper and used to generate hydraulic braking pressure.

Further, the illustrated example shows a wheel assembly with an in-wheel motor related to a steered wheel, but the invention can also be applied to a wheel other than a steered wheel.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A wheel assembly comprising:
   an in-wheel motor that transmits rotational output of an output shaft to a wheel via a reduction mechanism that includes a first reduction mechanism including a driving gear arranged on the output shaft of the in-wheel motor and a counter gear that includes an outer surface in mesh with the driving gear;
   an oil pump that is driven by rotational output of the counter gear; and
   an oil flow path that leads oil from the oil pump to the motor,
   wherein the oil pump is arranged inside the counter gear in a direction radially inward from the outer surface.

2. The wheel assembly according to claim 1, wherein the reduction mechanism includes a second reduction mechanism including a sun gear arranged concentrically with an axle center as an axis, a planetary gear in mesh with the sun gear, a ring gear in mesh with the planetary gear, and a planetary carrier attached to the planetary gear.

3. The wheel assembly according to claim 2, wherein the oil flow path is formed by an oil delivery which encircles a coil end of the motor and has a tubular cross section.

4. The wheel assembly according to claim 3, wherein the oil delivery has distribution holes that open to the outside in the radial direction at angular positions which are at appropriate intervals in a circumferential direction.

5. The wheel assembly according to claim 4 wherein the oil delivery is formed by an elastic member.

6. The wheel assembly according to claim 5 further comprising:
   oil grooves formed along an inner peripheral wall of a knuckle in an axial direction of the in-wheel motor,
   wherein the oil grooves communicate with the delivery holes such that the oil path includes a path from an oil pump outlet, through a gear shaft, through the oil delivery, through the delivery holes, to the oil grooves.

7. The wheel assembly according to claim 2, wherein the oil pump is arranged between the in-wheel motor and the second reduction mechanism in an axial direction of the pump.

8. The wheel assembly according to claim 1, wherein the oil pump is arranged concentrically, with an axle center as an axis, with respect to the first counter gear.

9. The wheel assembly according to claim 1, wherein the oil pump is arranged on a motor side of the first reduction mechanism in an axle direction.

10. The wheel assembly according to claim 1, wherein the output shaft of the motor is arranged offset with respect to an axle center by a distance substantially equal to a distance of a combined radii of the driving gear and the counter gear.

11. A wheel assembly comprising:
   an in-wheel motor that transmits rotational output of an output shaft to a wheel via a reduction mechanism that includes a first reduction mechanism including a driving gear arranged on the output shaft of the in-wheel motor and a counter gear including an outer surface in mesh with the driving gear;
   an oil pump that is driven by rotational output of the counter gear; and
   an oil flow path that leads oil from the oil pump to the motor,
   wherein the oil pump is arranged inside the counter gear in a direction radially inward from the outer surface, and
   wherein the output shaft of the motor is arranged offset upward, in a vehicle height direction, and forward, in a vehicle longitudinal direction, with respect to an axle center.

12. A wheel assembly comprising:
   an in-wheel motor that transmits rotational output of an output shaft to a wheel via a reduction mechanism that includes a first reduction mechanism including a driving gear arranged on the output shaft of the in-wheel motor and a counter gear including an outer surface in mesh with the driving gear;
   an oil pump that is driven by rotational output of the counter gear; and
   an oil flow path that leads oil from the oil pump to the motor,
   wherein the oil pump is arranged inside the counter gear in a direction radially inward from the outer surface,
   wherein the reduction mechanism includes a second reduction mechanism including a sun gear arranged concentrically with an axle center as an axis, a planetary gear in mesh with the sun gear, a ring gear in mesh with the planetary gear, and a planetary carrier attached to the planetary gear,
   wherein a gear shaft to which the sun gear is formed on a first end of the gear shaft and the counter gear is formed on a second end of the gear shaft in a vehicle width direction, and
   wherein the gear shaft is arranged along the axle center and the gear shaft rotates, via the first reduction mechanism, at a reduced rate than that of the output shaft of the in-wheel motor.

13. The wheel assembly according to claim 12 wherein the oil pump is provided inside the counter gear and is driven via a pump rotating shaft that is integral with the gear shaft, such that the pump rotating shaft and the gear shaft rotate together.

14. The wheel assembly according to claim 12 wherein the oil flow path includes a first portion that communicates the oil from an outlet of the oil pump axially through the gear shaft.

* * * * *